United States Patent
Schmunkamp et al.

(10) Patent No.: US 7,308,592 B2
(45) Date of Patent: Dec. 11, 2007

(54) REDUNDANT OSCILLATOR DISTRIBUTION IN A MULTI-PROCESSOR SERVER SYSTEM

(75) Inventors: Dietmar Schmunkamp, Schoenaich (DE); Andreas Wagner, Boeblingen (DE); Tobias Webel, Schwaebisch-Gmuend (DE); Ulrich Weiss, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/056,009

(22) Filed: Feb. 11, 2005

(65) Prior Publication Data

US 2006/0184814 A1   Aug. 17, 2006

(51) Int. Cl.
*G06F 1/12* (2006.01)
*G06F 13/42* (2006.01)
*H04L 5/00* (2006.01)

(52) U.S. Cl. .................. 713/400; 713/401; 713/500

(58) Field of Classification Search ............ 713/400, 713/401, 500
See application file for complete search history.

(56) References Cited

U.S. PATENT DOCUMENTS

| | | | | |
|---|---|---|---|---|
| 4,696,019 A | * | 9/1987 | Tulpule et al. | 375/356 |
| 4,823,262 A | * | 4/1989 | Calle | 713/375 |
| 5,517,638 A | * | 5/1996 | Szczepanek | 713/401 |
| 5,586,308 A | * | 12/1996 | Hawkins et al. | 713/501 |
| 6,069,512 A | * | 5/2000 | Rodriguez et al. | 327/200 |
| 6,675,307 B1 | * | 1/2004 | Heitkamp et al. | 713/401 |

* cited by examiner

*Primary Examiner*—Chun Cao
*Assistant Examiner*—Michael Wang
(74) *Attorney, Agent, or Firm*—Hamilton & Terrile, LLP; Stephen A. Terrile (57) ABSTRACT

The present invention relates to system clocking in computer systems. In particular, it relates to system clocking in high-end multi-processor, multi-node server computer systems with an enhanced degree of performance and reliability and to a method for dynamically switching between a first and a second clock signal, if the first should fail. More redundancy even to the Dynamic Clock Switching Circuit (DCSC) (14) and the wiring (17) from there to multiple, PLL-(12) free clock chips (22) is provided. Instead of only one DCSC (14) and one single wiring (17), two of them (14-0, 14-1; 17-0, 17-1) are used combined with a further particular logic present on each clock chip (22), which in combination generate two synchronous, fine-tuned, minimum-shifted clock signals and select always the first of them to arrive at a FlipFlop controlling the output for clock distribution wiring.

5 Claims, 6 Drawing Sheets

REDUNDANT OSCILLATOR DISTRIBUTION IN A MULTI-PROCESSOR SERVER SYSTEM

1. BACKGROUND OF THE INVENTION

1.1. Field of the Invention

The present invention relates to system clocking in computer systems. In particular, it relates to system clocking in high-end server computer systems with an enhanced degree of performance and reliability and to a method for dynamically switching between a first and a second clock signal, if the first should fail. Said first signal is the primary signal and the second signal is a stand-by signal for said computer system.

1.2. Description and Disadvantages of Prior Art

State-of-the-art clock switching is exemplarily disclosed at www.freescale.com/webapp/sps/site/.

The prior art Freescale MPC9993 Intelligent Dynamic Clock Switch (IDCS) circuit continuously monitors both input clock signals. Upon detection of a failure (clock stuck HIGH or LOW for at least 1 period), the INP_BAD for that clock will be latched (H). If that clock is the primary clock, the IDCS will switch to the good secondary clock and phase/frequency alignment will occur with minimal output phase disturbance. The typical phase bump caused by a failed clock is eliminated.

The prior art Freescale MPC9894 is a quad input redundant differential clock generator. The device contains logic for clock failure detection and auto switching for clock redundant applications. The generator uses a fully integrated PLL to generate clock signals from up to four redundant clock sources. The PLL multiplies the frequency of the input reference clock by one, two, four, eight or divides the reference clock by two or four. The frequency-multiplied clock signal drives four banks of two differential outputs, each bank allows an individual frequency-divider configuration. All outputs are phase-aligned and due to the external PLL feedback, the clock signals of all outputs are also phase-aligned to the selected input reference clock, providing virtually zero-delay capability.

Figure 1:
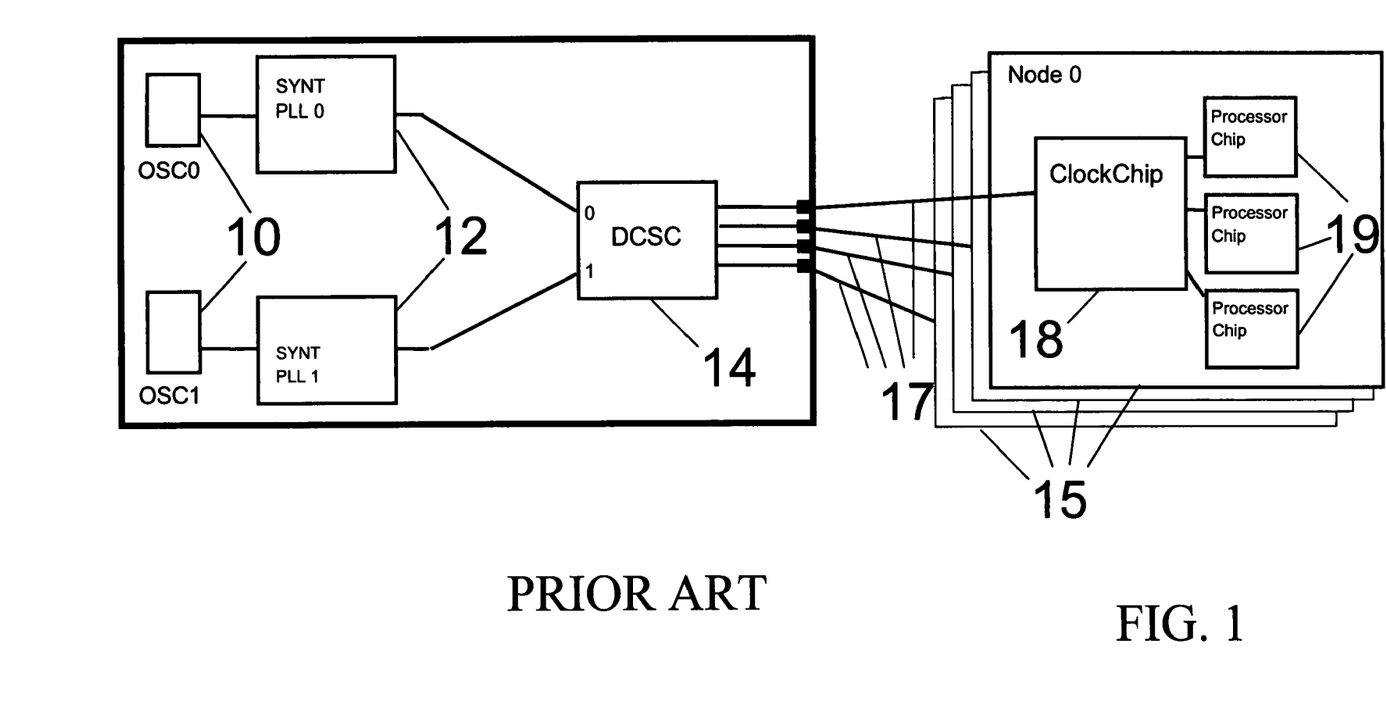
FIG. 1 shows a high-level prior art clock generation and distribution scheme for a multi-nodes server system.

A prior art multi-node system is depicted roughly in FIG. 1 with the focus directed to clock signal generation and distribution. The scheme given in FIG. 1 shows a prior art application with a standard 'Dynamic Clock Switch Circuit' (DCSC). The left box comprises two redundant pairs indexed 0 and 1 of oscillator 10 and synthesizer/Phase locked loop circuits 12 denoted as PLL. The clock signals as generated from an Oscillator are multiplied in frequency by said synthesizer/PLL circuits 12. A DCSC circuit 14 is provided for switching to the secondary clock signal, in case the primary clock signal would fail. DCSC 14 thus receives the multiplied clock signals and drives a plurality of N clock chips 18 provided on respective N nodes 15. A node is hereby understood to be a relatively large mainboard having, by way of example a number of 16, 32, or more processor chips implemented thereon. In a casing of a high-end server, for example a number of 10 nodes are arranged to build a mainboard tower.

Each processor chip 18 in turn comprises a fine clock signal distribution network for supplying said multiple processor chips with properly time-adjusted clock signals, in order to run the processors in highly synchronous operation modes.

The DCSC 14 thus allows a switch-over from the pair e.g. Oscillator 0/PLL 0 to the pair Oscillator 1/PLL 1, in case of a failure in pair 0. During this switch-over, the inner logic of DCSC 14 guarantees that the output of the DCSC 14 still generates valid clock signals, so that the processor chips 18 at the end of this outer clock distribution still get valid clock signals and continue operation.

The problem with this scheme, however, is that in case of a failure of the DCSC 14 itself or of the wiring 17 between DCSC and the clock chip the clock distribution will be interrupted and broken, and so the processor chips 15 will stop operation.

U.S. Pat. No. 6,675,307 provides a clock distribution, which resolves this problem for single-node computer systems. Disadvantageously, this system is not simply adaptable for multiprocessor or multi-node systems, as this would imply to implement many PLL circuits at each clock chip, which is not desired due to increased jitter and space consumption. Further disadvantageously, a large delay line is used, which results in decreased accuracy for the clock output. This decreased accuracy would reduce the system performance and therefore has to be avoided.

1.3. Objectives of the Invention

It is thus an objective of the present invention to provide a system and method for switching between two redundant clock signals in a multi-processor, multi-node computer system, wherein no outage time is required.

2. SUMMARY AND ADVANTAGES OF THE INVENTION

The foregoing objective of the invention is achieved by the features stated in enclosed independent claims. Further advantageous arrangements and embodiments of the invention are set forth in the respective subclaims. Reference should now be made to the appended claims.

Basically, the present invention provides for a method and circuit system for dynamically and precisely switching on-the-fly from a first primary clock to a second secondary stand-by clock in a computer system using no on-chip PLL circuits, wherein more security is achieved by providing redundancy even to the Dynamic Clock Switching Circuit (DCSC) and the wiring from there to the clock chip or the plurality of clock chips in case of multinode systems. Instead of only one DCSC and one single wiring, two of them are used combined with a further particular logic, which in combination generate two synchronous, fine-tuned, minimum-shifted clock signals and select always the first of them to arrive at a FlipFlop controlling the output for the clock distribution wiring.

More precisely, a primary DCSC's output is coupled to the input of a secondary DCSC and vice versa. Both DCSC supply clock signals to a clock chip in parallel and according to a precise timing scheme. On the clock chip, a particular, PLL-free logic is provided which selects always and consistently one of the two offered clock signals for forwarding it to the plurality of processor chips. This particular selection logic comprises: a phase compare logic, determining a phase shift between the clock signals, a delay circuit for dynamically adjusting the timing of the secondary clock signal to the primary one, an "Intelligent OR" circuit which selects always the signal which arrives the first at its input terminal, and a control logic which manages the required control signals saying which of the two clock signals is currently used, and if or if not the secondary signal is ready for operation.

The best implementation of the "Intelligent OR" selection circuit is driven by respective Enable signals generated by the control logic, and the two redundant clock signals. It comprises a Set/Reset FlipFlop driven by respective set and reset signals of the two clock signals, wherein the primary set signal is timed to arrive shortly before the set signal of the secondary clock signal arrives. The same is true for the two Reset signals. When the primary clock signal should fail, the Set/Reset Flip Flop is immediately driven by the respective next signal (Set or Reset) of the secondary clock. As there is only a minor time shift between them, and as this time shift is depending of the accuracy of the phase comparator and the delay line circuit, this time shift can be adapted individually to the prevailing circuit characteristics, and consequently, the time delay of the secondary clock signal has nearly the same effect as usually has phase jitter in those signals.

The setting of this phase jump, i.e., the difference between primary and secondary clock is dependant on the requirements given by a respective prevailing circuit and the allowed effort and complexity of the phase comparator and the delay line circuit. Typically, the phase jump is best set in a range of about 0.5% to about 5% of the cycle time. However, exceptional conditions might justify deviations there from, as long as the phase jump does not disturb the overall system operation.

3. BRIEF DESCRIPTION OF THE DRAWINGS

The present invention is illustrated by way of example and is not limited by the shape of the block diagram figures of the drawings in which.

4. DETAILED DESCRIPTION OF THE PREFERRED EMBODIMENT

Figure 2:
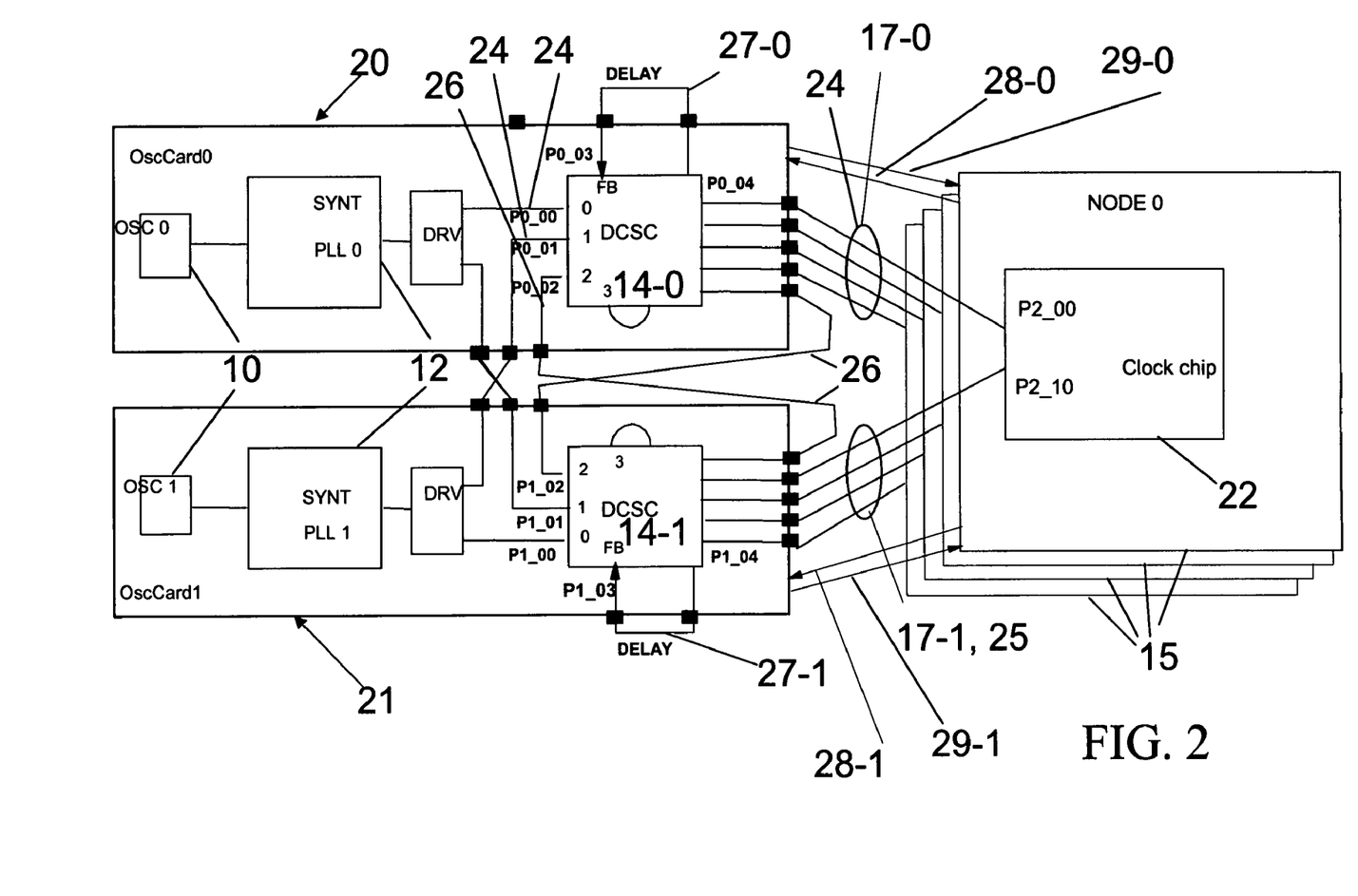
FIG. 2 shows a scheme set in accordance with the present invention which is in contrast to FIG. 1.

With general reference to the figures and with special reference now to FIG. 2 according to the invention two separate oscillator cards 20 and 21 indexed as 0 and 1 are provided. Both cards supply a plurality of N nodes with clock signals via clock lines 17-0 and 17-1. The processing within the clock chip 22 will be described later below. Each node has a clock chip 22 in accordance with the present invention and multiple processor chips (not depicted), as shown in FIG. 1.

In an exemplary denotation, the primary clock path 24 comprises the line denoted as P0_00, and the "long-distance lines" 17-0.

The redundant path 25 in case of an oscillator or PLL failure is denoted as P0_01, and the redundant path 26 for DCSC or wire failures is denoted as P0_02 and cross-couples the DCSC outputs to the respective other input. Here, long-distance lines 17-1 are used. At each of the N nodes a clock chip 22 receives redundant clock signals P2_00 and P2_10, respectively, over point-to point connections 17-0 and 17-1.

The invention particularly covers the failures of a DCSC 14-0, or 14-1 or in the long distance lines 17. A failure in a clock signal can be assumed to be represented by a "stuck" failure, when the clock signal remains constant at high, or at low level.

Delay circuits are symbolized by reference signs 27-0 and 27-1 in each redundant clock branch. They can be fine-tuned in their delay amounts and are lead in a feedback way from the output of each DCSC 14 back to its input.

P0_03 an P1_03 are the respective signal denotations. By tuning the delays 27 such that the delay of the cross-coupling lines 26 is included, it is possible to give a fine-tuning to the two DCSC output signals, such that they are exactly concurrent in time or time-shifted by a couple (e.g. 2 to 10) of picoseconds only.

The delays 27 can be set individually in order to balance circuit tolerances, which will be described later below.

Control signals 28 and 29 are provided for both cards. The signals 'oscswitch cnt1 0/1' and 'use osc 0/1' are used to control the oscillator switch circuitry according to the invention. With the signals 'use osc 0/1', a control chip on the oscillator card can define which oscillator card should be used as primary, and which as secondary.

One possible implementation is:

| Use osc 0 from card 0 | Use osc 1 from card 0 | Use osc 0 from card 1 | Use osc 1 from card 1 | Osc card 0 used as | Osc card 0 used as |
|---|---|---|---|---|---|
| 1 | 0 | 0 | 0 | only | disabled |
| 1 | 0 | 0 | 1 | primary | secondary |
| 0 | 0 | 1 | 0 | Disabled | only |
| 0 | 1 | 1 | 0 | Secondary | primary |

With the "oscswitch cntl" signals, all clock chips send their 'select status' back to the oscillator cards, and also indicate a failure on only one clock chip. This failure status is used to force all clock chips to switch to the secondary oscillator, what is required in a multi node system.

Another possible implementation is:

| Oscswitch cntl 0 on | Oscswitch cntl 1 | Means on primary card | Means on secondary card |
|---|---|---|---|
| 0 | 0 | Clock chip not available | this card not used |
| 1 | 0 | This card used as primary | Not possible |
| 0 | 1 | Clockchip sending this signal has switched to sec. >> force all clockchips to the other card by setting 'USE OSC' signals accodingly | This card s secondary |
| 1 | 1 | This card is primary, secondary card available | Not possible/ error |

Figure 3:
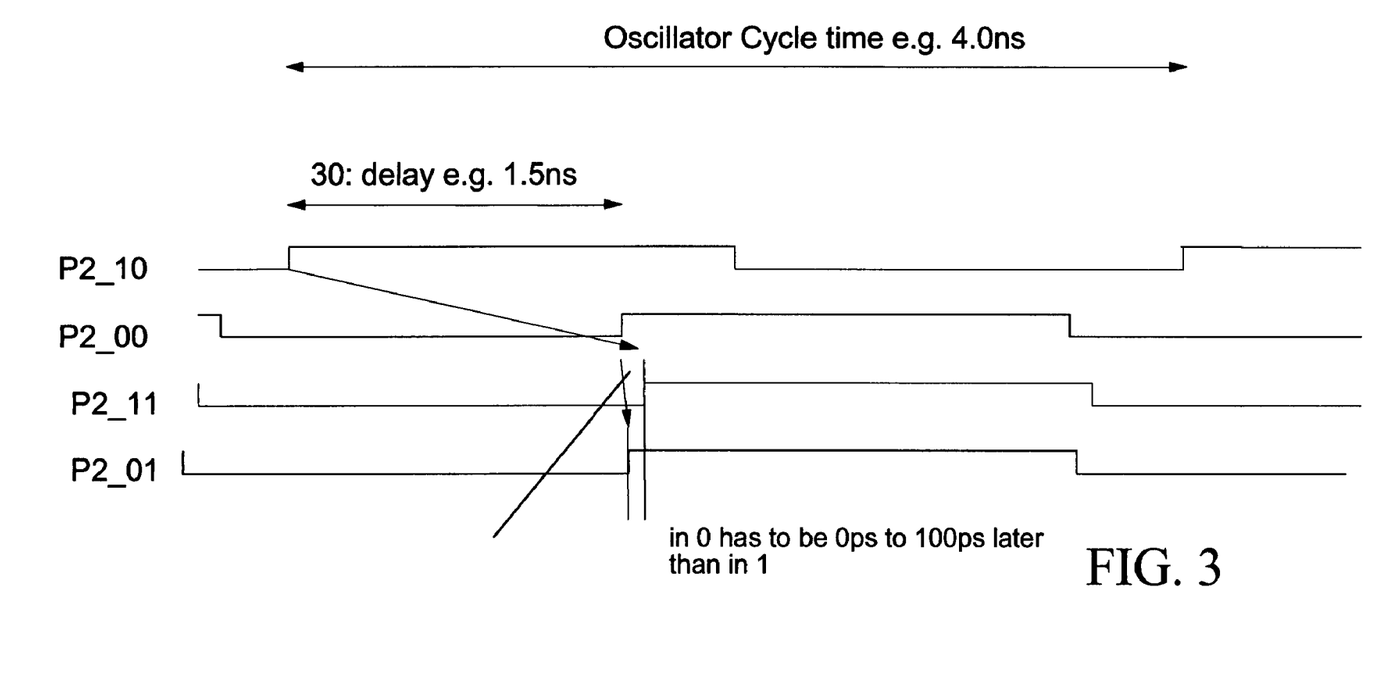
FIG. 3 is a timing scheme of oscillator signals according to a preferred embodiment.

FIG. 3 shows the signals P2_00 and P2_10 arriving at the clock chip 22, after having flown through the long distance lines 17 and being thus imparted with a certain delay relative to the DCSC 14 outputs.

P2_00 is assumed to be the primary signal. According to the invention the secondary signal P2_10 is now timed by the fine-tuning of the delays 27-0 and 27-1 to arrive earlier than the primary, which is displayed in FIG. 3, by a delay denoted as 30 of e.g. 1.5 nanoseconds typically. This delay of 1.5 nanoseconds is assumed to include all circuit and line differences due to circuit tolerances between the clock chip input terminals of P2_00 and P2_10 covering the DCSC itself, the cross coupling lines, the delay lines 27 and the long-distance lines.

Figure 4:
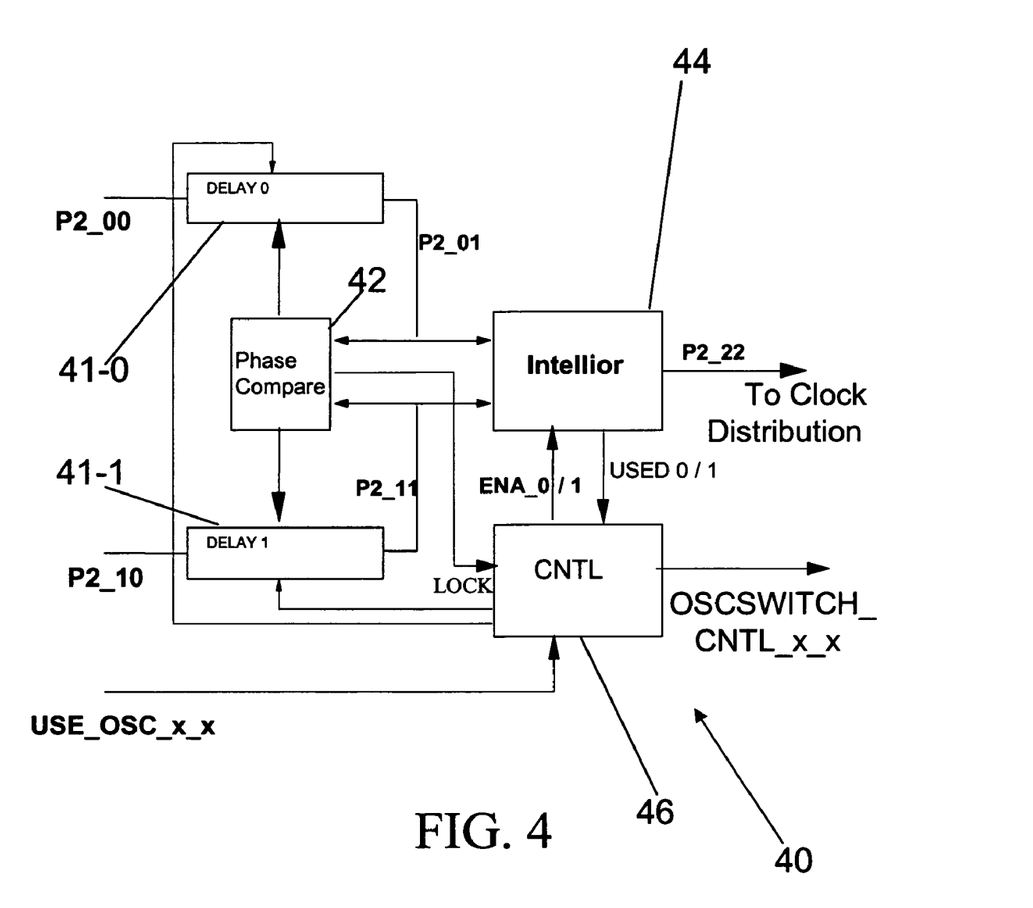
FIG. 4 shows some details of the clock signal provision logic according to a preferred embodiment.

FIG. 4 shows some details of the clock signal provision logic 40 provided on each clock chip according to a preferred embodiment of the invention.

Logic circuit 40 comprises a delay circuit 41-0 and 41-1 which receives the signal P2_00 and the earlier signal P2_10 as described before.

The output of each delay 41 is connected to a phase compare logic 42 and to an "Intelligent Or" circuit 44, which in turn is connected bidirectionally to a general control circuit 46.

P2_00 is continued to be the primary signal, the primary path further includes signal denoted as P2_01 and P2_22. A minimum delay may be associated always with the primary signal, which can be assumed to be minimal relative to the secondary signal.

The phase compare circuit 42 is fed by the output of the delay circuits 41-1 and 41-2. It adapts the delay circuit 41-1 of the secondary signal in a particular manner such that the output signal of delay 41-1 denoted as P2_11 is shifted to follow the output signal P2_01 delay 41-0 with a very small time shift, for example as graphically indicated in FIG. 7 by time gap 73, which points to the rising edge of the clock pulse. This adaptation is done in a closed-loop between the phase compare circuit, and the two prior art delay circuits 41-0 and 41-1. The P2_01 signal is given as lowest row in FIG. 3 for reference with the before-mentioned adjusted delay for P2_11 and with a "near-to-zero"-delay relative to P2_00.

The so called Intelligent-Or circuit 44 is a core circuit of the invention. Instead of providing a classic "select logic" driven by any multiplexer logic, this logic receives two input signals varying by a small time-shift in general and inherently produces an output signal P2_22 from the particular input signal, which arrives first at its input. The signal P2_22 is then used for further clock distribution as known from prior art.

Details of the "Intelligent-Or" circuit 44 will now be described in more detail with reference to FIG. 5 and FIG. 6.

Figure 5:
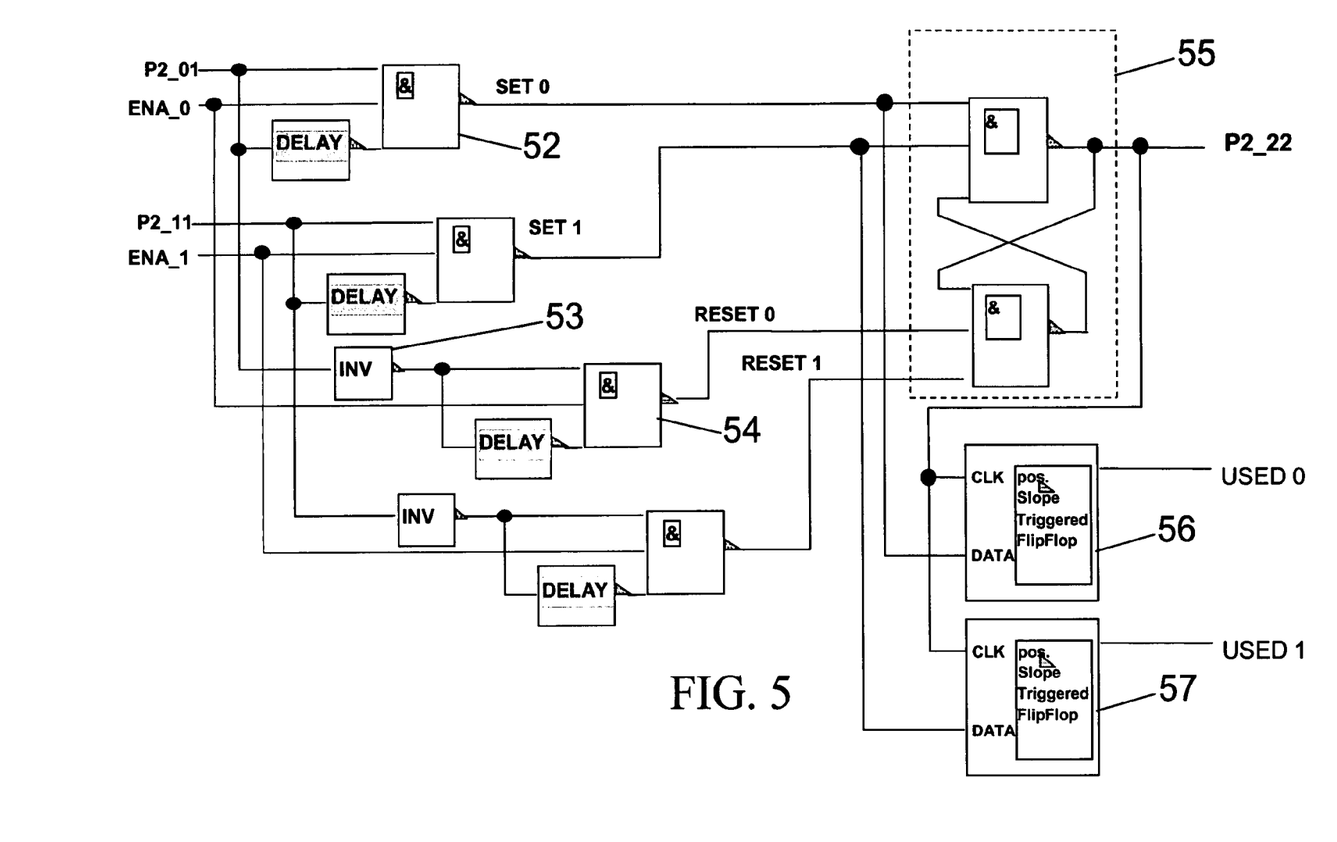
FIG. 5 shows some details of the "Intelligent-Or" circuit in FIG. 4.
Figure 6:
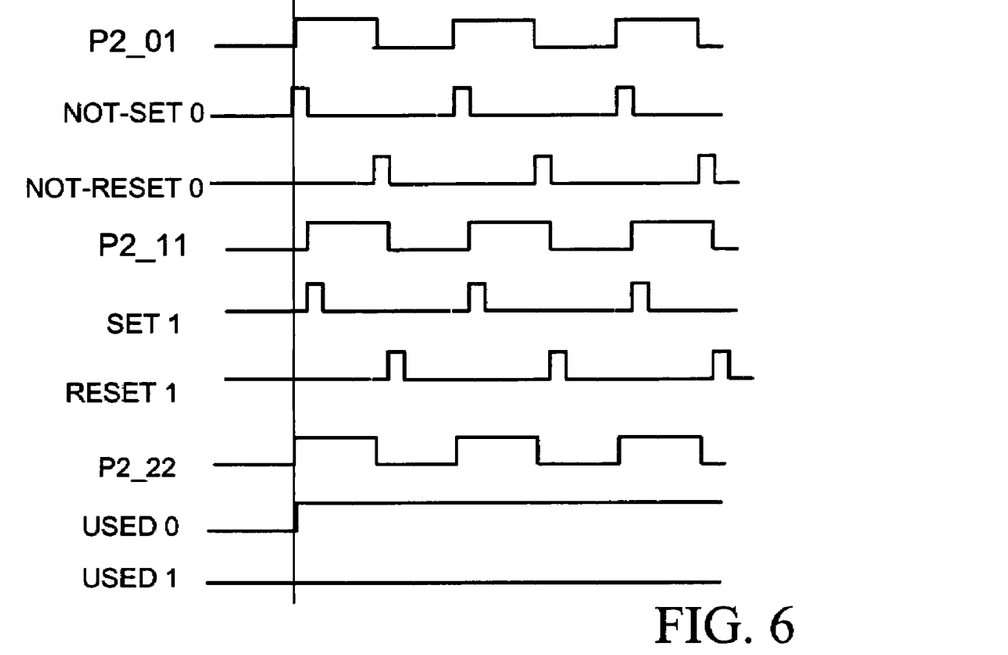
FIG. 6 is a timing scheme of oscillator signals prevailing in FIG. 5 circuit according to a preferred embodiment, when both, primary and secondary clock signals are properly operating.

FIG. 5 shows some details of the "Intelligent-Or" circuit 44 in FIG. 4, and FIG. 6 is a timing scheme of oscillator signals prevailing in the circuit of FIG. 5 according to a preferred embodiment, when both, primary and secondary clock signals are properly operating.

In FIG. 5, a Set/Reset FlipFlop 55 is connected at the output of the circuit 44. The input signal P2_01 is used to generate a pulse "SET 0" for a Set/Reset Flip Flop 55 with an upper NAND gate 52 by using the rising edge of the signal, and to generate a pulse "RESET 0" with an inverter 53 and the lower NAND gate 54 by using the falling edge. The FlipFlop output P2_22 is basically the same as the input P2_01, when there are no disturbances of the clock signals. This also reveals from the timing schemes given in FIG. 6.

The signals P2_11 and SET 1 and RESET1 are time-shifted as it was described above in FIG. 3, array 32.

The signal "Not SET0" has a rising edge which is earlier by a nearly-zero time-shift than P2_01.

The control signal "USED 0" is ON, since the first rising edge of P2_01. "Used 1" is OFF in the same time period.

Figure 7:
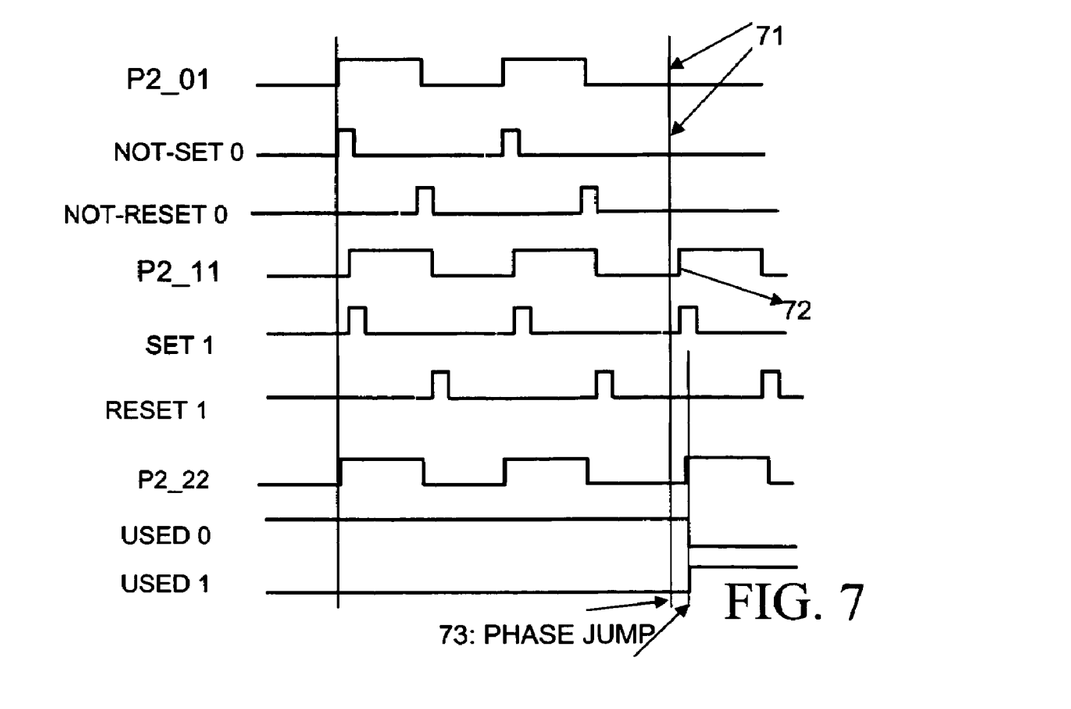
FIG. 7 is a scheme according to FIG. 6, when the primary clock signal fails.

FIG. 7 shows the failure situation when P2_01 fails, see arrow 71, where the signals P2_01, SET0 and RESET0 stuck all at low level. Thus, the FlipFlop 55 will neither be set nor reset.

In this situation the SET 1 and RESET1 signals help. They are generated in an analogous way as described above for signal P2_01 from the secondary signal P2_11. Now, according to the invention the secondary signal P2_11 and the respective derived SET 1 and RESET 1 signals, which have all been properly controlled to arrive "a bit" e.g. 100 picoseconds later than the corresponding primary signals, set and reset the FlipFlop 55 according to the required clock cycles, with a very small time delay, that is comparable to the phase jitter of such clock signals. By that, all processor chips can be operated without any interruption supplied by the secondary clock.

Next, with reference to FIGS. 4, 5, 6 and 7, the control signal generation, necessary to track the clock switching operation will be described in more detail.

In FIG. 5—bottom part—two Flipflops 56 and 57 are shown. They are triggered each by a positive slope. The clock input of both Flipflops is taken from the Set/Reset Flipflop 55 output. The data input of Flipflop 56 is the signal SET 0 from the output of the NAND gate 52. The data input of Flipflop 57 is the signal SET 1 from the output of the NAND gate 52. Flipflop 56 outputs a signal "used 0" which his high, when the clock signal P2_01 is used for clock distribution. Flipflop 57 outputs a signal "used 1" which his high, when the clock signal P2_11 is used for clock distribution. Either "used 0" or "used 1" is high, which is also shown in the timing scheme of FIG. 7. In case "used 0" falls from constant high level to low level, Flipflop 57 in FIG. 5 generates a high level output "used 1".

In FIG. 4 a control circuit 46 is shown connected to the signal selection logic 44, called "IntelliOr". It receives control signals, denoted as "used 0" and "used 1" from said logic 44. Further, control circuit 46 receives control signals from the oscillator cards denoted as "used_osc_x_x" as an input. In this implementation, such a separate control signal is used for each oscillator card 20 and 21, which is shown in FIG. 2 as signal 29-0 and 29-1.

The two "use_osc_x_x" signals 29-1 and 29-2 may provide a setting of four different value combinations:

A) 0/0 means that none of the oscillator cards 20 or 21 is used.
B) 1/0 means that card 20 is used as primary signal source, and card 21 is used as secondary signal source.
C) 0/1 means that card 20 is used as secondary signal source, and card 21 is used as primary signal source, and
D) 1/1 means that both cards are in use as primary signal source, as the phase shift is currently extremely small.

These signals 29 are evaluated by all nodes and tell the nodes, which of the clock signals are used, P2_00 or P2_11.

With reference back to FIG. 4 the before-mentioned control circuit 46 reads the two "use_osc_x_x" signals and forces the primary path delay circuit 41-0 to zero or nearly zero. The respective other delay, 41-1 must adapt the phase shift of the secondary signal according to the primary signal, such that the time gap 73 between the P2_01 slope and the trailing P2_11 slope is a) small enough to guarantee an interruption-free operation when the primary DCSC 14-0 or its wiring 17-0 fails, and b) large enough to guarantee a secure and time-stable detection of the control signal use_osc_0 or use_osc_1.

It should be noted that the use_osc 0/1 signals 29 in FIG. 2 are not time-stable, i.e., they "flicker" from low to high, when said time gap 73 is chosen too small, such that it lies within the prevailing jitter spectrum of the present circuits.

The incoming "used 0" and "used 1" signals are evaluated to result in a result signal "OSCSWITCH_CNTL_x_x, saying which of both oscillator cards are actually used.

Further, the control circuit 46 in FIG. 4 generates a control signal denoted as ENA_0/1. This signal is used to enable or disable, respectively, the P2_01 input or the P2_11 input into the "IntelliOR" circuit 44, see FIG. 5 or FIG. 4. They indicate whether or not the secondary signal is ready for operation. It is ready, when the phase compare circuit 42 in FIG. 4 determines after having completed a respective phase adaptation procedure that the phase of the secondary signal has reached said predetermined time shift as it was mentioned above.

Then the signal ENA_0 is set to high, and the signal ENA_1 is also set to high.

As a person skilled in the art will understand, both paths comprising the oscillators, the synthesizer/PLL circuits as well as the DCSC circuits are best implemented with digital circuits of high physical coincidence. The time width of the phase jump 73 may be set according to the requirements given in a respective present application situation dependent on the prevailing hardware properties. In particular, the phase jump should be set in a range between 0,5% to 5% of a cycle time. The setting is useful, when it lies within the phase jitter spectrum. For example, in a case, in which the clock signals P2_01 and P2_11 have a frequency of 2 Gigahertz, the cycle time is 500 picoseconds. Thus, 10% of that would mean a phase jump of 50 picoseconds. 1% corresponds to 5 picoseconds, and 0,1% corresponds to 0,5 picoseconds.

It should be added that the delayline 41-0 of the primary oscillator is best set always to 0 nanoseconds, whereas the delayline of the secondary delayline 41-1 is automatically adjusted such that the secondary input to the "Intelli-OR" 44 circuit is always later than the primary input to circuit 44.

After a switchover from clock0 to clock1 has occurred, the delay of delay circuit 41-1 is reduced to 0 nanoseconds step by step, wherein the step size of the delayline defines the phase jump width.

The invention claimed is:

1. A method for switching on-the-fly from a first primary clock signal source to a second secondary stand-by clock signal source synchronous to said first one, in a multi-node computer system, having a clock signal source each including an oscillator device, a synthesizer/phase locked-loop (PLL) circuit a plurality of N nodes each including a separate clock distribution chip, which is free of PLL circuits, a dedicated Dynamic Clock Switching Circuit (DCSC) connecting said clock signal sources and a respective said plurality of N clock distribution chips by means of a respective wiring provided for the switching process, said method comprising the steps of:

supplying a plurality of N clock signal distribution chips with said two separate clock signals;

controlling a phase of said two clock signals such that the signal edge of the secondary clock signal P2_10 arrives earlier than the corresponding signal edge of said primary clock signal P2_00 at each clock signal distribution chip;

fine-tuning a delay for said secondary clock signal at the input terminal of each of said clock distribution chips such that the phase of said secondary signal is late-shifted relative to phase of the primary signal by a predetermined phase difference; and selecting during normal operation the earlier phase clock signal, and in case the primary clock signal fails, selecting the remaining phase-shifted secondary signal for distribution to the processor chips.

2. The method according to claim 1, wherein the predetermined phase difference is set between 0.5% and 5% of the cycle time.

3. A multi-node computer system having a switching logic for switching on-the-fly from a first primary clock signal source to a second secondary stand-by clock signal source synchronous to said first one, with each said clock signal source (20, 21) including an oscillator device and a synthesizer/phase locked-loop (PLL) circuit, and each of a plurality of N nodes including a separate clock distribution chip, which is free of PLL circuits, and a dedicated Dynamic Clock Switching Circuit (DCSC) connecting between both clock signal sources and said respective plurality of N clock distribution chips with respective wiring provided for switching therebetween, comprising:

a) a second DCSC circuit with a separate second wiring to said respective plurality of N clock distribution chips;

b) phase-control logic for controlling said two clock signals such that the signal edge of the secondary clock signal P2_10 arrives earlier than the corresponding signal edge of said primary clock signal P2_00 at the input terminal of each clock signal distribution chip;

c) a tunable delay circuit at least for said secondary clock signal at each of said clock distribution chips arranged for a tuning such that the phase of said secondary signal is late-shifted relative to phase of the primary signal by a predetermined phase difference, and d) a PLL-free clock signal selection logic provided on each clock distribution chip (22) for selecting the earlier phase clock signal during normal operation, and in case the primary clock signal P2_01 fails, for selecting the remaining phase-shifted secondary signal P2_11 for distribution to the processor chips.

4. The computer system according to claim 3, wherein said clock signal selection logic comprises a SET/RESET Flipilop circuit driven by two phase-shifted, time-controlled, synchronous clock signals P2_01, P2_11.

5. A multi-node data processing system having at least one processor chip, comprising:

switching logic for switching from a first primary clock signal source, outputting a primary clock signal, to a second secondary clock signal source, outputting a secondary clock signal synchronous to said first one, each said clock signal source including an oscillator and a phase locked-loop circuit;

a plurality of N nodes including a separate clock distribution circuit, which is free of PLL circuits, and a dedicated dynamic clock switching circuit connecting both of said clock signal sources and said respective plurality of N clock distribution circuits;

a second dynamic clock switching circuit redundantly connecting said clock signal sources and said respective plurality of N clock distribution circuits;

phase-control logic to control said two clock signals such that the signal edge of the secondary clock signal arrives earlier than the corresponding signal edge of said primary clock signal at the input terminal of each clock signal distribution chip;

a delay circuit at least for said secondary clock signal at each of said clock distribution circuits to tune the phase of said secondary signal relative to the phase of the primary signal by a predetermined phase difference; and clock signal selection logic provided in each said clock distribution circuit that selects, independent of a phase locked loop circuit an earlier phase clock signal during normal operation, wherein if the primary clock signal fails the remaining secondary signal is distributed to the processor chips.

* * * * *